March 2, 1971 R. S. ROBINSON 3,567,249
ONE-WHEELED CYCLE TRAILER AND HITCH THEREFOR
Filed March 18, 1969
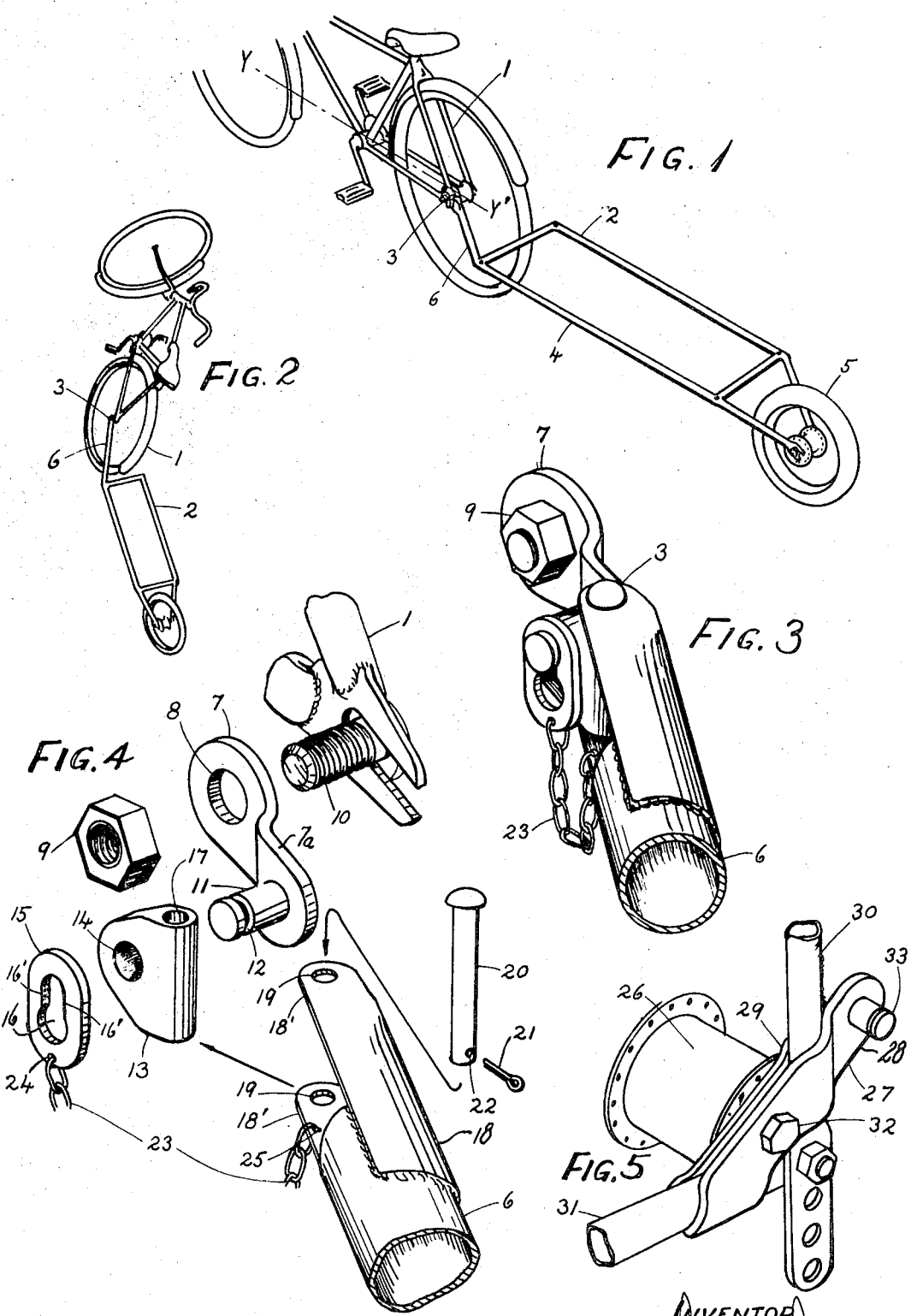
INVENTOR
Russell S. Robinson United States Patent Office 3,567,249
Patented Mar. 2, 1971

3,567,249
ONE-WHEELED CYCLE TRAILER AND
HITCH THEREFOR
Russell S. Robinson, 277 Main St.,
Farmington, Conn. 06032
Filed Mar. 18, 1969, Ser. No. 808,058
Int. Cl. B62d 53/00
U.S. Cl. 280—204
10 Claims

ABSTRACT OF THE DISCLOSURE

A one-wheeled trailer for a cycle has a single tongue which extends forwardly along one side of the rear wheel of the cycle and is connected to the cycle at a point laterally offset from such rear wheel and near its central axis. A hitch for connecting the tongue to the cycle permits the tongue to pivot relative to the cycle about turning and pitching axes, but prevents relative movement about a roll axis. The hitch includes a quick disconnecting means.

BACKGROUND OF THE INVENTION

This invention relates to trailers for connection to cycles, and more particularly to trailers having a single centrally disposed wheel for connecting to motor or pedal cycles of the type usually having two longitudinally disposed wheels. For purposes of definition, all cycles whether motor or pedal propelled, are hereinafter referred to as cycles.

Cycles are usually used for sport and for relatively short-range personal transport. It is often desirable however, to utilize the cycle for transport of cargo such as shopping or picnicking goods, books, or sporting equipment. For such purposes the carrying capacity and overall utility of the cycle is greatly increased by use of a trailer which is pivotally connected to said cycle and which enables the carrying of considerably more bulky and heavier cargoes than can be handled on the cycle itself.

For certain sport purposes and particularly when the cycle is to be used over rough roads and terrain, it is furthermore desirable that the trailer be capable of being banked and maneuvered in a similar manner to the cycle, and that a single wheel be used in the trailer which is so disposed as to follow approximately in the tracks of the cycle wheels.

It is furthermore very desirable that such a one-wheeled trailer be conveniently connectable to a wide range of makes and sizes of cycles with minimum necessity for special parts or for modification to the cycle, that it be conveniently and quickly connectable to and detachable from said cycles and that the receptacle or adaptor which is quasi-permanently connected to said cycle for receiving the connector of said trailer be compact and unobstrusive when the trailer is not connected to said cycle.

It is the object of this invention to provide a one-wheeled trailer and an associated hitch means having all of the above desirable characteristics. The hitch means of this invention provides for turning and pitching movement of the trailer with respect to the cycle throughout the maximum extent required for normal maneuvering of the cycle and also provides constraint against rolling movement of said trailer with respect to said cycle.

In order to provide connectability of the one-wheeled trailer of this invention to a wide range of makes and sizes of cycles, the itch means is displaced from the center line of the cycle in such a manner as to be connected to the structure of the cycle on one side thereof, hereinafter referred to as the selected side. Because cycles of different makes and sizes have a wide range of differing dimensions and materials of construction but virtually all cycles have a rear axle with its retaining axle nut, said structure to which the itch means is attached may comprise the rear axle of the cycle. Trailers according to the invention are furthermore provided with an unsymmetrically disposed tongue the rear end of which is rigidly connected to the forward end of the trailer chassis or body, the forward end thereof being adapted for connection with and forming a part of said hitch means. The tongue is furthermore outwardly displaced with respect to the rear wheel of the cycle a sufficient distance to provide clearance for turning the cycle in either direction to the maximum extent required for normal maneuvering.

In order to provide for the convenient connection and disconnection of a trailer with respect to a cycle, trailers according to the invention may also be provided with a quick release means which is embodied in an element of the hitch means.

BRIEF DESCRIPTION OF THE DRAWINGS

FIG. 1 is a view in perspective of the rear end of a cycle with a trailer according to the invention connected thereto. For the sake of simplicity the chassis only of the trailer is shown in this example.

FIG. 2 is a plan view from above of a cycle with a trailer as in FIG. 1 attached shown as banking and turning sharply to the right, that is in the direction away from the selected side of the cycle according to this example.

FIG. 3 is a perspective view of one form of hitch means embodying this invention in which the adaptor, which is quasi-permanently connected to the cycle, is rigidly retained on one end of the rear cycle axle.

FIG. 4 is an exploded view in similar perspective of the several components of the hitch means of FIG. 3.

FIG. 5 is a perspective view showing another form of adaptor which is quasi-permanently connected to the member of the cycle structure disposed on a selected side of said cycle.

DESCRIPTION OF THE PREFERRED EMBODIMENTS

Referring to the drawing, there is illustrated in the perspective view of FIG. 1 the rear portion of a cycle 1 which is connected to a one-wheeled trailer 2 by a hitch means 3. The trailer 2 is provided with a torsionally stiff frame or chassis 4 having a centrally-disposed rear wheel 5 and a hitch tongue 6. The rear end of the tongue 6 is rigidly connected by welding to the left side of the forward end of the frame 4 and the forward end of said tongue is connected to the hitch means 3, as later described. The tongue 6 is a tubular member and is disposed at an angle with respect to the frame 4 according to this example in such manner that the forward end thereof is located closer to the longitudinal center line y—y of the cycle 1 than its rear end. When the trailer 2 is connected to the cycle 1, the tongue 6 is thereby disposed in such manner that when the cycle is turned as sharply to the right as normal maneuvering requires, the tongue will not contact the rim of the rear cycle wheel, its mudguard, or any other typical structure of the cycle, as clearly shown in FIG. 2.

The hitch means of this invention may take various different forms and consists of a part, referred to as an adaptor, quasi-permanently fixed to the cycle, a part fixed to or integral with the forward end of the trailer tongue, an intermediate part, and means pivotally connecting the intermediate part to one of said other two parts for movement about a turning axis and to the other of said two parts for movement about a pitching axis.

Referring to FIGS. 3 and 4, the illustrated hitch means 3 comprises an adaptor 7 including an elongated, bent plate 7a having a hole 8 formed in its forward end. The hole 8 is of such a diameter as to accommodate the largest rear axle 10 known to be used in a range of well known makes of cycles. According to this example, the axle nut 9 is removed, the adaptor 7 is slid home on the rear axle 10 by inserting the axle in the hole 8, and then the nut 9 is replaced and tightened sufficiently to provide a rigid and quasi-permanent connection of the adaptor 7 to the cycle 1. The adaptor 7 also includes a substantially horizontal, laterally outwardly extending trunnion 11 fixed to the rear end portion of the plate 7a, the outer end of which trunnion is formed to include a locking groove 12.

The intermediate part of the illustrated hitch means 3 consists of a block 13 provided with a horizontal hole 14 which is slidably received on the trunnion 11 to pivotally connect the block to the trunnion for pivotal movement relative thereto about a horizontal pitching axis. The block 13 is retained on the trunnion by a removable key 15 received in the trunnion groove 12, said key being formed with a slot 16 having a round large opening at the lower end thereof of sufficient size to pass over the trunnion 11 and having a narrower upper end formed by two straight side walls 16', 16' spaced by a distance less than the outer diameter of the trunnion but greater than the base diameter of the groove 12 so as to be receivable in the groove and releasably held to the trunnion thereby. The block 13 is further provided with a vertical hole 17 which is substantially perpendicular to but does not intersect the hole 14. The part of the hitch means fixed to the tongue 6 in the illustrated case comprises a curved plate 18 welded thereto and including vertically spaced, forwardly extending upper and lower fork members 18', 18', said members being provided with coaxial holes 19, 19 in such manner that said holes are roughly vertical when the trailer 2 is in its average operational attitude as shown in FIG. 1. A headed pin 20 is passed downwardly through the holes 19, 17, and 19, thereby pivotally connecting the tongue 6 to the block 13 for pivotal movement relative thereto about a vertical turning axis. The pin 20 is quasi-permanently retained by a split pin 21 which is passed through a hole 22 formed in the end thereof. To prevent loss of the key 15, one end of a chain length 23 is permanently clipped into a small hole 24 formed in the bottom end of said key, the other end of said chain being similarly clipped into a small hole 25 formed in the lower fork member 18'.

It will be clearly seen in the example according to FIGS. 3 and 4 that the hitch means described permits the one-wheeled trailer 2 to freely turn about the axis of the pin 20 and pitch about the axis of the trunnion 11. Throughout normal angles of turn, however, said connector will apply constraint in roll in such manner that bank or roll of a one-wheeled trailer according to the invention will be governed by the extent of the bank or roll of the cycle to which it is connected. That is, the construction of the hitch means 3 is such that roll of the trailer relative to the cycle is prevented, the means for preventing this roll movement being the tongue plate 18, the block 13 and the adaptor 7, which are so connected to one another and to the cycle and trailer that no roll movement is possible between any two connected parts. For cases where very large angles of turn and bank may be desired the invention provides that the axis of the headed pin 20 or the equivalent be sloped forwardly from approximately vertical attitude, and for the axis of the trunnion 11 or the equivalent to be sloped with respect to the approximate transverse attitude as described above. It will also be clearly noted that when the trailer 2 is removed from the cycle 1, the adaptor 7 which is quasi-permanently retained on the axle 10, constitutes an unobstrusive and barely visible connecting means which does not interfere in any way with the operation or appearance of the cycle.

In certain forms of cycles, retention of the adaptor on the end of the axle may not be desirable. For such cases the invention provides for quasi-permanent connection of the adaptor to another member or members of the cycle disposed on a selected side thereof as above described. FIG. 5 shows such a connection to a cycle 26 having a rear wheel of relatively small diameter (not shown). The adaptor 27 in this example includes a front plate 28 provided with a central hole which registers with a similar hole (not shown) formed in a rear retaining plate 29. The front and rear plates 27 and 29 are disposed on the outer and inner surfaces respectively of frame members 30, 31 disposed on one side of the cycle 26, and a bolt 32 is passed through said holes in said plates on the far side of which bolt a nut (not shown) is screwed on and tightened in well-known manner, thereby rigidly connecting said adaptor to said members. The upper or rear end of the adaptor front plate 28 is provided with a horizontal, laterally outwardly extending trunnion 33 which is similar to the trunnion 11 of the example of FIGS. 3 and 4 and to which the other parts of the hitch means may be attached as to the trunnion 11 of FIGS. 3 and 4.

It will be clearly understood that one-wheeled trailers according to the invention may be provided with basket bodies or bins for carrying cargo which may be used in lieu of, or superimposed on, the simple frame 4 as shown in FIGS. 1 and 2. Alternatively a frame may be provided having a seat or saddle for carrying one or more passengers. It will furthermore be understood that the quick release means of the example of FIGS. 2 and 3 may comprise one of several well-known quick release devices, and may be constructed so that the head pin 20 embodies a quick release means of well-known form, the block 13 being quasi-permanently connected to the trunnion 11 by well-known means.

It is further within the scope of the invention that the connecting adaptor, such as the adaptor 7 of FIGS. 3 and 4, be constructed to embody the axle nut 9 and that in such a construction trunnion 11 and nut 9 may be coaxial.

I claim:

1. In combination with a cycle and a one wheeled trailer to be located behind said cycle and having a tongue extending forwardly beyond the rear end of the rear wheel of said cycle and laterally displaced to one side of said rear wheel, of a hitch means for connecting the forward end of said trailer tongue to said cycle, said hitch means being laterally displaced to said one side of said rear wheel and being located near the central axis of said rear wheel, said hitch means comprising means permitting said tongue to pivot about turning and pitching axes relative to said cycle, and means restraining said tongue against movement about a roll axis relative to said cycle.

2. The combination defined in claim 1 further characterized by said hitch means comprising a first part fixed to said cycle, a second part fixed to said tongue, an intermediate part, means connecting said intermediate part to one of said other two parts for movement relative thereto about said turning axis, and means connecting said intermediate member to the other of said two parts for movement relative thereto about said pitching axis, the one of said latter two means which connects said intermediate part to said first part including a hand operable means for releasably holding said first part in assembly with said intermediate part.

3. The combination defined in claim 2 further characterized by said first part which is fixed to said cycle being a generally cylindrical trunnion having an axis arranged generally parallel to said central axis of said rear wheel and extending outwardly from said one side of said cycle, said intermediate member comprising a block having a horizontal opening which pivotally receives said trunnion and also having a generally vertically extending opening, said part fixed to said tongue comprising two vertically spaced forwardly extending fork members provided with coaxial holes, said block being received between said fork members with said vertical opening thereof aligned with said coaxial holes of said fork members, and a pin passing through said coaxial holes of said fork members and said vertical hole of said block for pivotally connecting said block to said fork members for relative movement about said turning axis.

4. The combination defined in claim 3, further characterized by said cycle having an axle for said rear wheel, said trunnion being fixed to an adaptor plate, said adaptor plate having an opening therein receiving said axle, and a nut threaded onto said axle for fixing said plate to said cycle.

5. The combination defined in claim 3, further characterized by said trunnion being located on the rear end of a plate which overlies the outer surface of two frame members of said cycle located near the rear axle thereof, a retaining plate cooperating with said first plate and engaging the inner surfaces of said two frame members, a bolt passing between said two plates, and a nut on said bolt for tightly clamping said two plates to one another and to said two frame members to fix said trunnion relative to said cycle.

6. A combination as defined in claim 3, further characterized by said trunnion including a groove on its outer end portion which groove is located outwardly of said block when said block is received thereon, and a locking key adapted to releasably engage said groove to retain said block on said trunnion.

7. The combination defined in claim 6, further characterized by a flexible connecting member connected at one end to said key and at the other end to said tongue to prevent said retaining key from escaping said tongue.

8. In combination with a cycle and a one-wheeled trailer adapted to be located behind said cycle and having a tongue extending forwardly beyond the rear end of the rear wheel of said cycle and laterally displaced to one side of said rear wheel, of a hitch means for connecting the forward end of said trailer tongue to said cycle, said hitch means comprising a generally cylindrical trunnion fixed to said cycle and laterally displaced to said one side of said rear wheel and near the central axis of said rear wheel, an intermediate member, means connecting said intermediate member to said tongue for movement relative to said tongue solely about a first axis fixed relative to said tongue and said intermediate member, said intermediate member having an opening therein for receiving said trunnion, said opening having a central axis which when said trunnion is received in said opening constitutes a second axis fixed relative to said intermediate member and said cycle about which said intermediate member is pivotally movable relative to said cycle, one of said first and second axes being oriented generally horizontally when said cycle is in its average operating attitude and the other of said axes being oriented generally vertically when said cycle is in its average operating attitude, and means for releasably holding said trunnion in assembly with said intermediate member.

9. The combination defined in claim 8, further characterized by said trunnion having a free end portion which is located outwardly of said intermediate member when said intermediate member is received thereon and which free end portion includes a groove, and said means for releasably holding said trunnion in assembly with said intermediate member including a locking key adapted to releasably engage said groove to retain said intermediate member on said trunnion.

10. The combination defined in claim 9, further characterized by said rear wheel of said cycle including an axle, said trunnion being fixed to an adaptor plate, said adaptor plate having an opening therein receiving said axle, and a nut threaded onto said axle for fixing said plate to said cycle.

References Cited

UNITED STATES PATENTS 3,347,559  10/1967  Robinson _____ 280—204

FOREIGN PATENTS 518,188  12/1920  France _____ 280—204
837,511  4/1952  Germany _____ 280—204

LEO FRIAGLIA, Primary Examiner

U.S. Cl. X.R.

280—492